Feb. 25, 1930.  E. G. STRECKFUSS  1,748,685
MEAT CLAMP FOR SLICING MACHINES
Filed Nov. 28, 1927  2 Sheets-Sheet 1
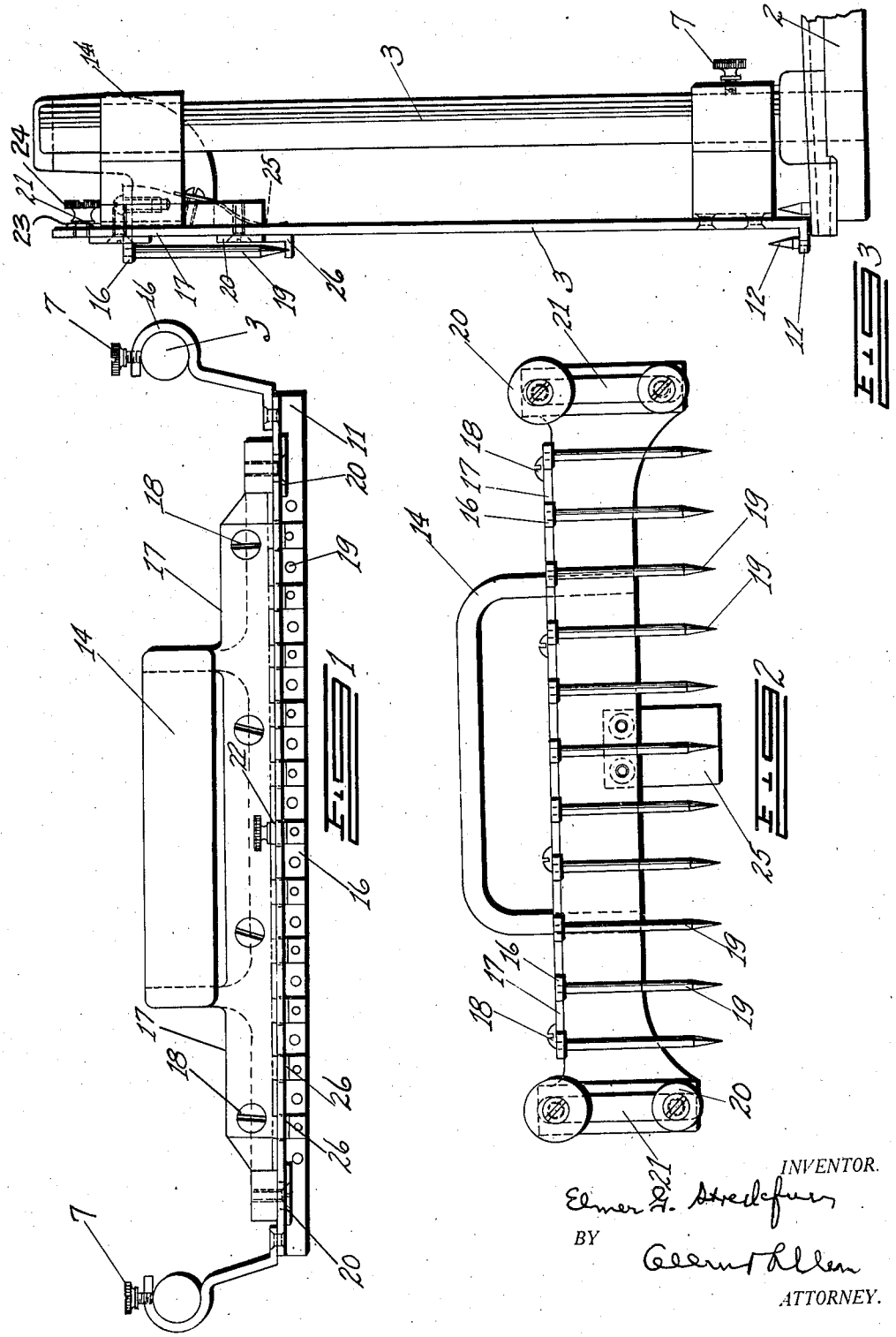
INVENTOR.
Elmer G. Streckfuss
BY
ATTORNEY.

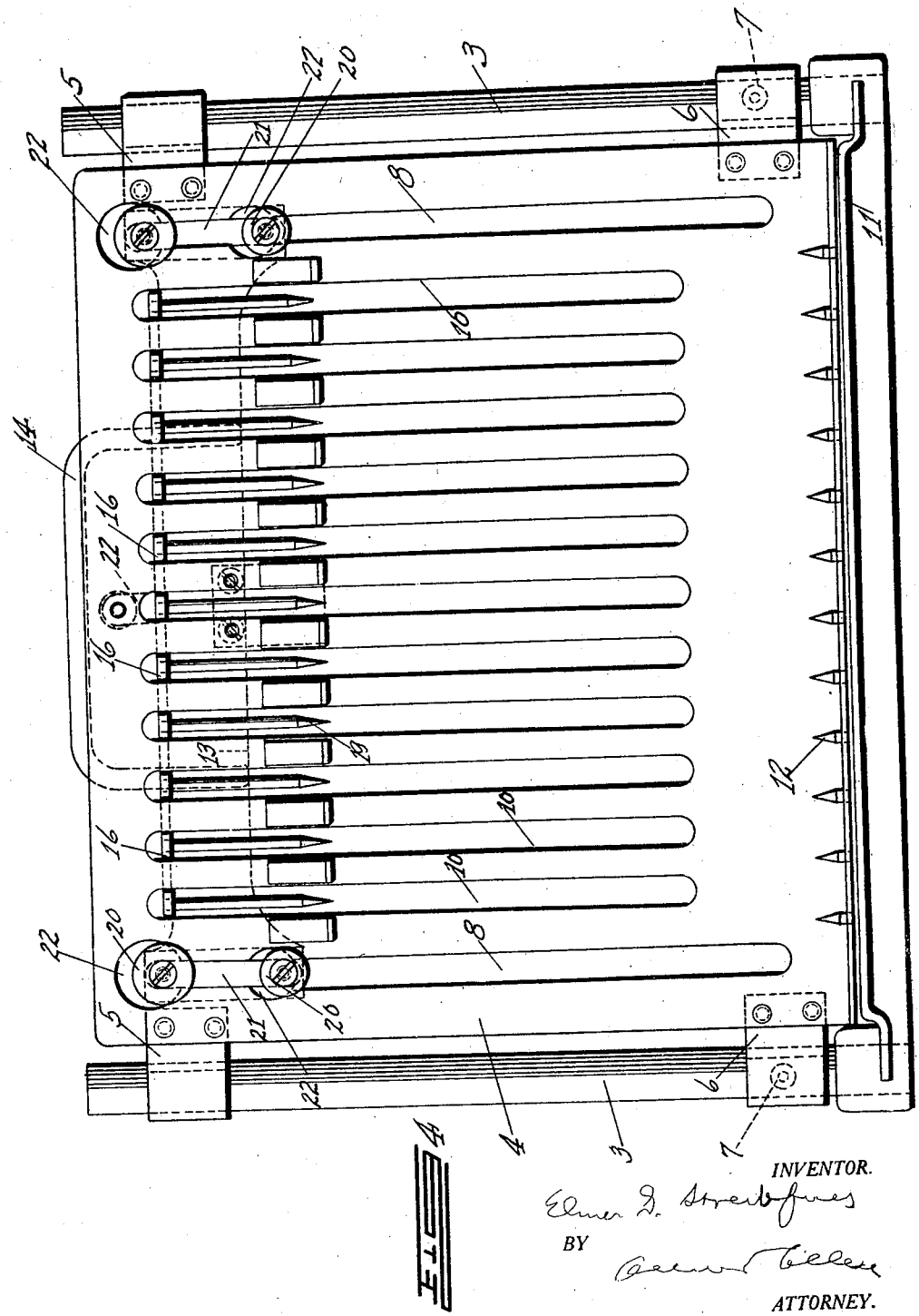

Patented Feb. 25, 1930

1,748,685

UNITED STATES PATENT OFFICE

ELMER G. STRECKFUSS, OF CINCINNATI, OHIO, ASSIGNOR TO THE CINCINNATI TIME RECORDER COMPANY, OF CINCINNATI, OHIO, A CORPORATION OF OHIO

MEAT CLAMP FOR SLICING MACHINES

Application filed November 28, 1927. Serial No. 236,131.

My invention relates to clamps for holding meat in slicing machines, and particularly to clamps for holding meat ends.

In most slicing machines a piece of meat to be cut is placed on a movable carriage and fastened down by means of a clamp. The carriage is then advanced with an intermittent movement which presents an exposed end of the meat to a rotating knife, and either the knife or the carriage are oscillated. As the carriage is advanced the meat is cut slice after slice until the end piece remains which is usually an inch or more in thickness.

It is toward the provision of an improved auxiliary clamp which will permit the slicing operation to be continued on the end of a piece down to a very fine slice, that my invention is directed. It is my object to provide a clamp which will fit on a machine having an intermittently advancing slice feed, and I will describe the clamp as applied to a machine with an oscillating knife such as is described in my co-pending application Serial No. 96,296, the illustrated embodiment permitting pieces to be sliced down to a point where the last piece is almost as thin as the regular slices.

The value of sliced meat is ordinarily higher than of the end pieces, so most butchers save up their end pieces, and then when they have time, they attempt to slice the ends as well as they can. It is my object to provide a clamp for the ends which will allow great economy in slicing, and which may be placed on the meat carriage after the regular clamp has been removed.

It is an object of my invention to provide a clamp in which the component parts may readily be detached for cleaning, and in which an upper clamping unit may be disassembled from the lower part of the clamping assembly by a simple adjustment.

The above and other objects to which reference will be made in the ensuing disclosure I accomplish by that certain arrangement and combination of parts of which I have illustrated a preferred embodiment.

In the drawings:—

Figure 1 is a plan view of the clamping assembly detached from the supporting carriage.

Figure 2 is a front elevation of the upper clamping unit detached from the clamp assembly.

Figure 3 is a side elevation of the clamp assembly showing parts of the supporting carriage on which the clamp assembly is mounted.

Figure 4 is a front elevation of the clamp assembly.

Generally indicated at 2 (Figure 3) is the carriage which is slidably mounted on the machine frame. The knife and the operating mechanism which advances the carriage after each slice of meat has been made is not shown, but there are many different constructions of slicing machines for which my auxiliary clamp is adapted, one of which is adequately described in my co-pending application Serial No. 96,296, filed March 20, 1926.

Extending up from the carriage are the vertical posts 3 which support the clamping assembly. I have provided a back plate 4 which acts as backing for the meat, to which are secured the upper half round bearing members 5 and the lower half round bearing members 6. The lower bearing members 6 have thumb screws 7 with which the bearing members may be clamped on the vertical posts 3 in desired position. Although half round bearing members are preferably used because they permit the clamp base plate to be mounted on the posts from the side, the bearings might be completely circular, and the base plate might be mounted in position by being inserted over the tops of the upright members 3. The base plate is provided with a series of end slots 8 in which the slidable bearing supports of the upper clamp unit are mounted. The base plate also has a series of vertical slots 10 which allow clearance for the upper clamping unit during its operation. The lower end of the base plate is flanged out as indicated at 11 and I have shown a series of sharp pins 12 extending upwardly from the flanged portion of the plate. The pins 12 protrude into a piece of meat, held in the clamp, from below.

The upper clamping unit has a laterally extending bar 13 to which is secured the operating handle 14. Extending in through the slots 10 in the base plate are a series of lugs or fingers 16 which are integrally formed with a plate 17 secured to the top of the bar 13 with screws 18. Extending downwardly from the fingers 16 are the sharp pins 19 which are so positioned that when the clamp is closed the pins 19 and 12 will lie in the same plane as the base plate 4 but so that the pins will be in interspaced position in a series of planes extending out at right angles from the base plate.

So that the upper clamping unit may slide readily in the base plate I have provided a series of studs having washers 20 thereon, which studs are mounted on filler plates 21. The studs extend through the slots 8 and the washers bear with their inner surfaces against the outer surfaces of the plate 4. Adjacent the tops of the slots 8 I provide circular enlarged portions 22 of the slots 8, through which the washers 20 may be withdrawn thereby detaching the upper clamp unit from the base plate so that the clamping assembly may be cleaned readily and without danger. In order to retain the upper clamp unit so that it will not become dislodged accidentally, there is a locking lug 23 which may be moved to such a position that it will abut the top edge of the bar 13 and prevent the upward movement of the upper clamping unit to such a position that the washers and circular orifices will register. By unfastening a thumbscrew 24 with which the lug 23 is mounted on the plate 4 the lug may be swung on its pivot, thereby providing sufficient clearance to allow the rollers on the upper clamp assembly to register with the withdrawal enlargements in the slots 8.

A friction spring 25 is mounted on the back surface of the bar 13, and this spring bears against the back surface of the plate 4, thereby preventing the upper clamp from sliding too rapidly downward, and thus being likely to pierce the hands of the operator of the slicer.

When a piece of meat has been sliced down to the end and is about to be removed, the upper clamp unit is elevated by the handle 14. Usually the thin slab of meat held by the sharp pins is elevated with the upper clamp, so in order to remove the slab of meat I have provided stripping lugs 26 extending out from the face of the plate 4. These lugs are preferably so mounted on the partition strips between the slots 10 that with the upward movement of the upper clamp the lugs lie in interspaced position between the fingers 16, thereby preventing further upward movement of the slab of meat, which is stripped off the sharp pins.

The operation of using the auxiliary clamp hereinbefore described will be apparent. The thin end of a piece of meat is placed above the pins 12 and the upper clamp is brought down into contact with the meat, so that the pins 19 pierce the meat and press it down onto the pins 12. The slicer is then turned on in the usual way, and the carriage 2 is set in motion. The slicing operation is continued until the slicer knife practically abuts the outer edge of the flange 11. The remaining slice of meat will be substantially less than one quarter of an inch thick, so that the wastage in end slicing will be cut down very materially over what has, in the past, been possible.

Having thus described my invention, what I claim as new and desire to secure by Letters Patent, is:—

1. In a meat clamp, a backing plate having interspaced slots therein, and a clamping unit having a supporting portion on one side of the plate with projections extending therefrom through said slots, and clamping members carried by said projections, and means for demountably supporting said unit at least in one of said slots.

2. In a meat clamp, a backing plate having meat engaging extensions at one end thereof and interspaced slots therein, and a movable clamping unit having a supporting portion on one side of the plate with projections extending therefrom through said slots, and clamping members carried by said projections, and means carried by the backing plate for stripping off meat carried by said clamping members on said movable clamping unit.

3. A meat clamp having means for mounting same on a movable carriage, and comprising a backing plate and two series of meat engaging projections arranged to have movement one set with relation to another in a plane parallel with the plane of said plate, a supporting member from which said movable series of projections extend, and means for slidably mounting said supporting member on said backing plate, said backing plate having enlarged orifices therein for permitting the withdrawal of said supporting member in certain positions of movement.

ELMER G. STRECKFUSS.